United States Patent Office 2,864,683
Patented Dec. 16, 1958

2,864,683

SELECTIVE METHOD OF INHIBITING PRE-EMERGENT GROWTH OF GRASSES

Philip C. Hamm, Webster Groves, and Angelo J. Speziale, Kirkwood, Mo., assignors to Monsanto Chemical Company, St. Louis, Mo., a corporation of Delaware No Drawing. Application September 13, 1954
Serial No. 455,735

13 Claims. (Cl. 71—2.7)

This invention relates to herbicidal compounds and methods for their use. More particuarly, this invention relates to methods of inhibiting the growth of grasses in the presence of other vegetation.

Many chemical compounds are known to be deleterious to the growth of vegetation and to have herbicidal effects under specific conditions, some of which are known to be quite effective at low levels of application. It is, however, a more difficult problem to provide useful herbicides for selective activity on undesirable plants, but which are otherwise harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to the contact herbicides.

It is the primary purpose of this invention to provide a new and useful class of general herbicides and methods for their use. A further purpose of the invention is to provide methods of destroying grasses in the presence of broad leaf plants. Still further purposes of the invention will be apparent from the following disclosure.

In accordance with this invention it has been discovered that compounds of the following chemical structure have unusual and valuable herbicidal activity

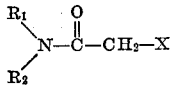

wherein the $R_1$ and $R_2$ radicals may be selected from the group consisting of hydrogen, alkyl radicals having up to six carbon atoms, alkenyl radicals having up to six carbon atoms, alkynyl radicals having up to six carbon atoms, halo-substituted alkyl radicals having up to six carbon atoms, halo-substituted alkenyl radicals having up to six carbon atoms, halo-substituted alkynyl radicals having up to six carbon atoms, and oxa-alkyl radicals having up to six carbon atoms, not more than one of the $R_1$ and $R_2$ groups being hydrogen, and wherein the X radical is a halogen atom.

Suitable compounds for use in the practice of this invention are the α-haloacetamides, including the α-chloroacetamide, the α-bromoacetamide, the α-iodoacetamide and the α-fluoroacetamide, wherein the amide nitrogen contains at least one aliphatic substituent, the disubstituted compounds having radicals which may be the same or different. The substituted α-haloacetamides may contain as substituents the alkyl radicals such as methyl, ethyl, propyl, isopropyl, n-butyl, primary isobutyl, secondary isobutyl, tertiary butyl, n-amyl, any of the branch chain amyls and any of the hexyl radicals; the alkenyl, including vinyl, allyl, crotyl, methallyl and methyl vinyl radicals; the alkynyl radicals, including propargyl, the halo-alkyl radicals, such as 2-chloroethyl, 2-chloropropyl, 3-chloropropyl, chloromethyl and 2-bromopropyl radicals; the halo-alkenyl radicals such as 2-chloroallyl, 3-chlorocrotyl, 3-chloroallyl, 2,3-dichloroallyl, 3-chloro-2-butenyl, 3-bromoallyl and 2-iodoallyl; the halo-alkynyl radicals such as 2-chloropropargyl, 3-bromopropargyl and 4-chloromethyl propargyl; and the oxa-aliphatic radicals such as 2-methoxyethyl, 2 - ethoxyethyl, 3 - methoxypropyl, 3 - butoxypropyl and 2-ethoxyethoxyethyl.

The above-defined α-chloroacetamides having aliphatic nitrogen substituents may in general be prepared by reacting the acid chloride of haloacetic acid with an excess of a primary or secondary amine. The preparation of the compounds having two nitrogen substituents are made from the symmetrical or unsymmetrical secondary amines depending on whether the substituents are to be the same or different, by selecting amines with the desired configuration. The compounds wherein one of the substituents is to be hydrogen are prepared by a reaction of the haloacetyl chloride with a primary amine. If the reagents are liquids, the preparation will merely involve mixing the said reagents under refrigerated conditions so as to prevent an excessive rate of reaction. It is frequently advantageous to conduct the reaction in the presence of a stoichiometric amount of caustic soda, and where the product being prepared is a solid substance, it is often desirable to conduct the reaction in the presence of a suitable solvent, for example ethylene dichloride. The N-substituted α-chloroacetamides may be separated from the reaction mixture and from the incident impurities by distillation or by fractional crystallization from the solvent medium or from other suitable solvents. Further details in the preparation of these compounds are set forth with respect to the following examples.

*Example 1*

A one liter flask provided with a reflux condenser and an efficient mechanical stirring device was immersed in an ice bath and charged with 320 ml. of 5 percent sodium hydroxide solution and 30.3 g. of di-n-propylamine. While maintaining the temperature between 0 and 5° C., 45 g. of chloroacetyl chloride was gradually added over a period of one hour and 40 minutes. When the reagents had been combined, the 5 ml. of 20 percent sodium hydroxide was added to raise the pH value to 9. The solution was then allowed to warm up to room temperature. After one-half hour, the reaction mixture was saturated with solid sodium chloride. The supernated oil layer was extracted with several portions of chloroform and the chloroform solution was washed quickly with 20 ml. of water and dried with anhydrous sodium sulfate. The solvent was evaporated by vacuum distillation and the resultant oil was distilled at 120° C. at 8.5 mm. total pressure. The product so obtained was identified as α-chloro-N,N-di-n-propyl acetamide.

*Example 2*

A one liter flask provided with a reflux condenser and a stirring mechanism was charged with 500 cc. of ethylene dichloride and 97.2 g. of diallylamine. The flask and its contents was cooled to —10° C. by immersing the flask in a freezing mixture. While maintaining the temperature at —10° C. with the vigorous agitation of the reagents 66.5 g. of chloroacetyl chloride was added gradually through a one-half hour period. After the reagents were combined, the mixture was stirred until the temperature rose to 15-20° C. at which time 50 cc. of water was added. The solvent layer was separated and washed with 50 cc. of a saturated sodium chloride solution. The solvent was evaporated in a vacuum and the resultant oil distilled at 92° C. at 2 mm. total pressure. The product so prepared was identified as α-chloro-N,N-diallyl acetamide.

Example 3

A 500 ml. flask provided with a reflux condenser and a mechanical stirrer was charged with 8 g. of dipropargylamine, 40 ml. of 10 percent sodium hydroxide solution and 100 ml. of ethylene dichloride. The flask and its contents were cooled to −10° C. and while so cooled 11 g. of chloroacetyl chloride was gradually added with stirring over a 15 minute period. After the addition of reagents was completed, the mixture was stirred for one-half hour while the temperature gradually rose to 10° C. The two liquid phases were separated and the aqueous phase extracted with three 50 cc. portions of ethylene dichloride. The extracts were combined with the solvent phase, washed with 5 percent hydrochloric acid and water, and then dried with magnesium sulfate. The ethylene dichloride was evaporated under vacuum and the product distilled at pressure of 0.5 mm. The resulting liquid product was identified as α-chloro-N,N-dipropargylacetamide.

Example 4

A 500 ml. round flask provided with a stirring mechanism and a reflux condenser was charged with 26 g. of n-amylamine, 72 g. of 20 percent sodium hydroxide solution and 100 ml. of ethylene dichloride. The mixture was cooled to a −10° C. and with vigorous agitation 40.6 g. of chloroacetyl chloride was added over a period of 80 minutes. The cooling bath was then removed and the temperature allowed to rise to 10° C. over a one-half hour period. The two liquid phases were separated and the water phase washed with two portions of ethylene dichloride which were combined with the organic phase. The organic phase was washed with 5 percent hydrochloric solution, 5 percent sodium bicarbonate solution and with water. After drying over anyhdrous magnesium sulfate, the ethylene dichloride was evaporated in vacuo and the resulting liquid product distilled at 0.5 mm. pressure. The product so obtained was identified as α-chloro-N-amylacetamide.

Example 5

A 500 ml. flask was charged with 26 g. of 3-chloropropylamine hydrochloride, 50 ml. of water and 100 ml. of ethylene dichloride. The mixture was cooled with stirring and 27 g. of chloroacetyl chloride and 88 g. of 20 percent of sodium hydroxide solution was gradually added over a one-half hour period while maintaining the temperature between −5° and −10° C. The rate of addition of the chloroacetyl chloride and sodium hydroxide was so regulated that the pH of the mixture was maintained between 8.0 and 8.5. After the reagents had been combined, the mixture was permitted to stand for one-half hour, during which time the temperature rose to 10° C. The two liquid phases which formed were separated and the aqueous phase washed with ethylene dichloride. The extracts were combined with the organic phase and washed with 5 percent hydrochloric acid and water. After drying the product over magnesium sulfate, the ethylene dichloride was evaporated at reduced pressures. The resulting product, which was recrystallized from benzene, was identified as α-chloro-N-(3-chloropropyl) acetamide.

Example 6

The preparation of Example 1 was repeated except that n-butyl amine was used in place of di-n-propyl amine. The compound so prepared was identified as n-butyl α-chloroacetamide.

Example 7

The preparation of Example 1 was repeated except that di-n-butyl amine was used in place of di-n-propyl amine. The compound so prepared was identified as di-n-butyl α-chloroacetamide.

Example 8

The preparation of Example 4 was repeated except that di-isoamyl amine was used in place of amyl amine. The compound so prepared was identified as di-isoamyl α-chloroacetamide.

Example 9

The preparation of Example 5 was repeated except that 2-chloroethyl amine was used in place of 3-chloropropyl amine. The compound so prepared was identified as 2-chloroethyl α-chloroacetamide.

Example 10

The preparation of Example 4 was repeated except that isoamyl amine was used in place of amyl amine. The compound so prepared was identified as isoamyl α-chloroacetamide.

Example 11

The preparation of Example 5 was repeated except that 2-chloropropyl amine was used in place of 3-chloropropyl amine. The compound so prepared was identified as 2-chloropropyl α-chloroacetamide.

Example 12

A 500 ml. flask provided with a reflux condenser and stirring mechanism was charged with 26.7 g. of 3-methoxypropylamine, 72 g. of 20 percent sodium hydroxide solution and 125 ml. of ethylene dichloride. The mixture was cooled in a Dry Ice ethanol mixture and while maintaining the temperature at −10° C. 40.8 g. of chloroacetyl chloride was added with stirring over a 70 minute period. The mixture was then stirred for one-half hour during which time the temperature was permitted to rise to 10° C. The two liquid phases were separated and the aqueous phase extracted with ethylene dichloride. The ethylene dichloride phase and the extracts were combined, washed with water, 5 percent hydrochloric acid solution and again with water, and dried over anhydrous magnesium sulfate. After removing the ethylene dichloride at reduced pressures, the mixture was fractionally distilled to recover a colorless liquid identified as α-chloro-N-(3-methoxypropyl) acetamide.

Example 13

The preparation of Example 5 was repeated except that methyl ethyl amine was used in place of 3-chloropropyl amine. The compound resulting was identified as N-ethyl-N-methyl α-chloroacetamide.

Example 14

The procedure of the above examples was repeated using 2-chloroallyl amine and the resulting compound was identified as N-2-chloroallyl α-chloroacetamide.

Example 15

The procedure of the above examples was repeated using 3-chloroallyl amine and the resulting compound was identified as N-3-chloroallyl α-chloroacetamide.

Example 16

A 500 ml. flask was charged with 25.3 g. of di (2-chloroallyl)-amine, 7.2 g. of sodium hydroxide, 32 ml. of water and 100 ml. of ethylene dichloride. The mixture was cooled to −10° C. and while maintaining at this temperature 20.2 g. of chloroacetyl chloride was added over a 45 minute period. After the mixture warmed to 10° C. the organic layer which formed was separated and washed with dilute hydrochloric acid, dilute sodium bicarbonate and with water. After drying, the solvent was evaporated at reduced pressure and the product distilled at 130° C. at 2.2 mm. pressure. The recovered product was identified as N,N-di-(2-chloroallyl)-α-chloroacetamide.

Example 17

The procedure of the previous example was repeated except that 2,3-dichloropropylamine was used in place of the the di(2-chloroallyl)-amine. The resulting compound was identified as N-2,3-dichloropropyl-α-chloroacetamide.

*Example 18*

The procedure of Example 16 was repeated except that di(2,3-dichloropropylamine) was used in place of dichloroallylamine. The resulting product was identified as N,N-bis(2,3-dichloropropyl)-α-chloroacetamide.

*Example 19*

Using the procedure described in Example 2, except that bromoacetyl chloride was used in place of chloroacetyl chloride, a compound was prepared which was identified as N,N-diallyl-α-bromoacetamide.

*Example 20*

A sample of the N,N-diallyl-α-chloroacetamide prepared in accordance with Example 2 was charged to a 500 ml. flask containing 200 cc. of acetone and an excess of potassium iodide. The mixture was refluxed for 8 hours. After filtering the acetone solution, the acetone was evaporated and the resulting product identified as N,N-diallyl-α-iodoacetamide.

The relative value of each of the chloroacetamides was determined by planting in greenhouse flats seeds of eight different plants each representing a principal botanical type. The flats were treated with the various herbicides at the rate equivalent to 5 lbs. per acre. In the following tables of herbicidal evaluation data, these plants are represented by letters as follows:

A _____ Wild oat.
B _____ Cheat grass.
C _____ Rye
D _____ Buckwheat.
E _____ Mustard.
F _____ Beet.
G _____ Cotton.
H _____ Cucumber.

The relative value of each compound with respect to its herbicidal effect on the various plants is indicated by a number as follows:

0 _____ No phytotoxicity.
1 _____ Slight phytotoxicity.
2 _____ Moderate phytotoxicity.
3 _____ Severe phytotoxicity.

|  | A | B | C | D | E | F | G | H |
|---|---|---|---|---|---|---|---|---|
| α-chloro-N,N-di-n-propyl acetamide | 3 | 3 | 3 | 0 | 0 | 1 | 0 | 1 |
| α-chloro-N,N-diallyl acetamide | 3 | 3 | 3 | 0 | 0 | 1 | 0 | 2 |
| α-chloro-N,N-dipropargyl-acetamide | 3 | 3 | 3 | 0 | 0 | 0 | 0 | 1 |
| α-chloro-N-amylacetamide | 2 | 3 | 1 | 1 | 2 | 0 | 0 | 0 |
| α-chloro-N-(3-chloropropyl) acetamide | 3 | 3 | 2 | 2 | 1 | 0 | 0 | 0 |
| n-butyl α-chloroacetamide | 1 | 2 | 1 | 0 | 0 | 0 | 0 | 0 |
| di-n-butyl α-chloroacetamide | 0 | 3 | 2 | 0 | 0 | 0 | 0 | 0 |
| di-isoamyl α-chloroacetamide | 1 | 2 | 2 | 0 | 0 | 0 | 0 | 0 |
| 2-chloroethyl α-chloroacetamide | 2 | 3 | 2 | 0 | 0 | 1 | 0 | 0 |
| isoamyl α-chloroacetamide | 3 | 3 | 1 | 0 | 0 | 0 | 0 | 0 |
| 2-chloropropyl α-chloroacetamide | 3 | 3 | 3 | 0 | 0 | 3 | 0 | 1 |
| α-chloro-N-(3-methoxypropyl) acetamide | 3 | 3 | 3 | 0 | 0 | 0 | 0 | 0 |
| N-ethyl-N-methyl α-chloroacetamide | 2 | 2 | 1 | 0 | 0 | 1 | 0 | 0 |
| N-2-chloroallyl α-chloroacetamide | 3 | 3 | 3 | 0 | 1 | 0 | 0 | 2 |
| N-3-chloroallyl α-chloroacetamide | 3 | 3 | 1 | 0 | 1 | 0 | 0 | 1 |
| N,N-di-(2-chloroallyl)-α-chloroacetamide | 1 | 3 | 1 | 0 | 1 | 2 | 0 | 1 |
| N-2,3-dichloropropyl α-chloroacetamide | 2 | 3 | 0 | 0 | 1 | 0 | 0 | 1 |
| N,N-bis(2,3-dichloropropyl) α-chloroacetamide | 2 | 3 | 1 | 0 | 0 | 0 | 0 | 1 |
| N,N-diallyl-α-bromoacetamide | 2 | 1 | 3 | 0 | 0 | 0 | 1 | 2 |
| N,N-diallyl-α-iodoacetamide | 1 | 2 | 2 | 0 | 0 | 0 | 0 | 1 |

In order to demonstrate the utility of the new herbicides and their selective activity with respect to grasses, other closely related compounds not included within the scope of the claims were examined and subjected to the same phytotoxicity tests. In the following table the letters and the numerical symbols have the same significance as in the preceding table. The level of application in these tests is also 5 lbs. per acre.

|  | A | B | C | D | E | F | G | H |
|---|---|---|---|---|---|---|---|---|
| α-chloroacetamide | 0 | 2 | 0 | 0 | 0 | 1 | 0 | 0 |
| N-phenyl α-chloroacetamide | 0 | 2 | 0 | 0 | 0 | 2 | 0 | 0 |

The following table also demonstrates the critical nature of the particular haloacetamides claimed. The herbicide in these tests was applied at the rate of 25 lbs. per acre.

|  | A | B | C | D | E | F | G | H |
|---|---|---|---|---|---|---|---|---|
| α-chloro-N,N-diallyl-acetamide | 3 | 3 | 3 | 0 | 1 | 3 | 0 | 3 |
| α-α-dichloro-N,N-diallyl-acetamide | 1 | 3 | 2 | 1 | 2 | 0 | 1 | 1 |
| α-chloro-N,N-di(n-propyl) acetamide | 3 | 3 | 3 | 1 | 0 | 3 | 0 | 2 |
| α-α-dichloro-N,N-di(n-propyl) acetamide | 0 | 0 | 0 | 0 | 0 | 0 | 0 | 0 |
| α-chloro-N,N-diethyl acetamide | 3 | 3 | 3 | 0 | 0 | 1 | 0 | 1 |
| α-α-dichloro-N,N-diethyl-acetamide | 0 | 0 | 0 | 0 | 0 | 0 | 0 | 1 |
| α-α-α-trichloro-N,N-diethyl-acetamide | 0 | 1 | 1 | 0 | 0 | 1 | 0 | 0 |
| β-chloro-N,N-diallyl propionamide | 0 | 0 | 0 | 0 | 0 | 1 | 0 | 0 |

From the foregoing tables of evaluation data, it will be apparent that the N-substituted α-haloacetamides are effective herbicides at both the 5 and 25 lbs. per acre level of application, and that at the lower level unusual specific herbicidal activity with respect to grasses is evident. At the higher level of application the selective activity with respect to grasses is not as pronounced, some of the broad leaf plants being at times inhibited. These data demonstrate that the presence of a single halogen atom on the alpha carbon of the acetamide is critical, and that the presence of additional halogen atoms seriously reduces or destroys the herbicidal activity. The evaluation data also demonstrate that the aliphatic nitrogen substituents are also very important and that compounds without a substituent and with aromatic substituents are of little or no utility as herbicides. It will also be observed that the β-chloropropionamides are not effective, the single carbon atom adjacent to the carbonyl of the acetamide being a significant function of the active configuration.

Although most of the compounds prepared are those having a single chlorine atom on the alpha carbon, analogous compounds having bromine, iodine and fluorine substituents are also useful herbicides. The data demonstate a slightly lower pre-emergence activity with respect to the iodine and bromine derivatives. This apparent disability is more than offset by the significantly better contact herbicidal activity, which has been universally observed with respect to the bromine and iodine analogues.

From the above tables of data it will be evident that the herbicidal action of the N-substituted α-haloacetamides of this invention are unusual, since near homologs not within the scope of this invention are relatively useless as herbicides. Valuable herbicidal effects will be observed by applications of small amounts, for example as low as 1 lb. of active component per acre as well as high concentrations, for example 100 lbs. per acre. The selective activity on grasses is exhibited at lower rates of application, for example from 2 to 15 lbs. per acre. For general application and herbicidal effect on both the grasses and the dicotyledonous plants, it will be found necessary to use from 10 to 50 lbs. per acre.

Selective herbicidal activity with respect to several genera of grasses is illustrated by the data in the above tables. Other experiments run with respect to plants of different genera, which have different metabolisms and physical characteristics indicate little or no inhibition of growth. The three botanical types, or genera, of grasses which are effectively controlled by means of the α-haloacetamides of this invention, embrace a large number of undesirable plants, or weeds, frequently found in vegetable crops. This invention is not limited to removing grasses from broad leaf plants, since the selective activity will be useful in removing weeds from corn, which belongs to a different genus of grass. Many other crops and particularly the broad leaved plants are inhibited by weeds of the wild oat, cheat and rye genera, which can be effectively controlled by the practice of this invention. In some instances there are minor herbicidal effects on dicotyledonous plants, and therefore optimum results may depend to some extent on experience with respect to the activity of the particular N-substituted α-haloacetamide on the vegetable crop to be treated.

As demonstrated above, unusual grass specificity can be achieved at lower levels of application, whereas at higher levels of application the N-substituted α-haloacetamides exhibit a more general herbicidal effect. This provides another and quite different utility in the removal of plants of a large number or all botanical genera. It will be apparent that quite different effects can be obtained by modifying the method of use. For this reason an essential part of this invention is the formulation so as to permit a uniform predetermined application of herbicide to leaves or soil surfaces so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted α-haloacetamides may be water-soluble and mere dissolution will then provide a useable formulation. Often the N-substituted α-haloacetamides are only limitedly soluble in water and therefore aqueous formulations will necessarily be dispersions of minute drops of the water-insoluble substances in suspension in an aqueous medium. The known water-insoluble substituted α-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

This application is a continuation-in-part of our application Serial No. 389,491, filed October 30, 1953, and now abandoned.

What is claimed is:

1. A method of preemergently inhibiting the growth of plants which comprises treating the plant growing medium with a quantity at least sufficient to inhibit the germination of seeds contained in the plant growing medium of N-alkylene α-chloroacetamide wherein the alkylene radical has up to six carbon atoms.

2. A method of preemergently inhibiting the growth of plants which comprises treating the plant growing medium with a quantity at least sufficient to inhibit the germination of seeds contained in the plant growing medium of N,N-diallyl α-chloroacetamide.

3. The method of preemergently inhibiting the germination of seeds in contact with soil which comprises contacting the said soil with a herbicidal amount of N-allyl-alpha-chloro acetamide.

4. The method of selectively inhibiting the germination of grass seeds and the preemergence growth thereof in the presence of growing crops, which comprises treating the soil medium with a herbicidal amount of a compound of the structure:

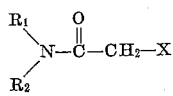

wherein each of the $R_1$ and $R_2$ radicals is selected from the group consisting of hydrogen, alkyl radicals having up to six carbon atoms, alkenyl radicals having up to six carbon atoms, alkynyl radicals having up to six carbon atoms, halo-substituted alkyl radicals having up to six carbon atoms, halo-substituted alkenyl radicals having up to six carbon atoms, and halo-substituted alkynyl radicals having up to six carbon atoms, not more than one of the $R_1$ and $R_2$ groups being hydrogen, and wherein the X radical is a halogen atom of the group consisting of chlorine, bromine and iodine.

5. The method of selectively inhibiting the germination and preemergent growth of grasses from seeds in contact with soil, which comprises treating the said soil with a herbicidal amount consisting of from one to 15 pounds per acre of a compound having the structure:

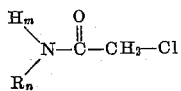

wherein $R_n$ is an aliphatic hydrocarbon radical having up to six carbon atoms; $m$ is an integer from 0 to 1, $n$ is an integer from 1 to 2, provided that the sum of $n$ and $m$ is always 2.

6. The method defined by claim 4 wherein the herbicidal compound is N,N-diethyl alpha-chloro acetamide.
7. The method defined by claim 4 wherein the herbicidal compound is N,N-di (n propyl) alpha-chloro acetamide.
8. The method defined by claim 4 wherein the herbicidal compound is N-(3-chloropropyl) alpha-chloro acetamide.
9. The method defined by claim 5 wherein the herbicidal compound is N,N-diethyl alpha-chloro acetamide.
10. The method defined by claim 5 wherein the herbicidal compound is N,N-di (n propyl) alpha-chloro acetamide.
11. The method defined by claim 5 wherein the herbicidal compound is N-(3-chloropropyl) alpha-chloro acetamide.
12. The method defined by claim 5 wherein the herbicidal compound is N-allyl-alpha-chloro acetamide.
13. The method defined by claim 5 wherein the herbicidal compound is N,N-diallyl-alpha-chloro acetamide.

References Cited in the file of this patent

UNITED STATES PATENTS

| | | |
|---|---|---|
| 2,409,315 | Rigby et al. | Oct. 15, 1946 |
| 2,622,975 | Zimmerman et al. | Dec. 23, 1952 |
| 2,622,976 | Hitchcock et al. | Dec. 23, 1952 |
| 2,636,816 | Stewart | Apr. 28, 1953 |
| 2,649,363 | Swezey | Aug. 18, 1953 |

FOREIGN PATENTS

| | | |
|---|---|---|
| 812,376 | Germany | Aug. 30, 1951 |